Dec. 10, 1940.                C. R. MYERS ET AL                 2,224,272
                           AUTOMATIC SAW PROTECTOR
                            Filed March 18, 1940           2 Sheets-Sheet 1
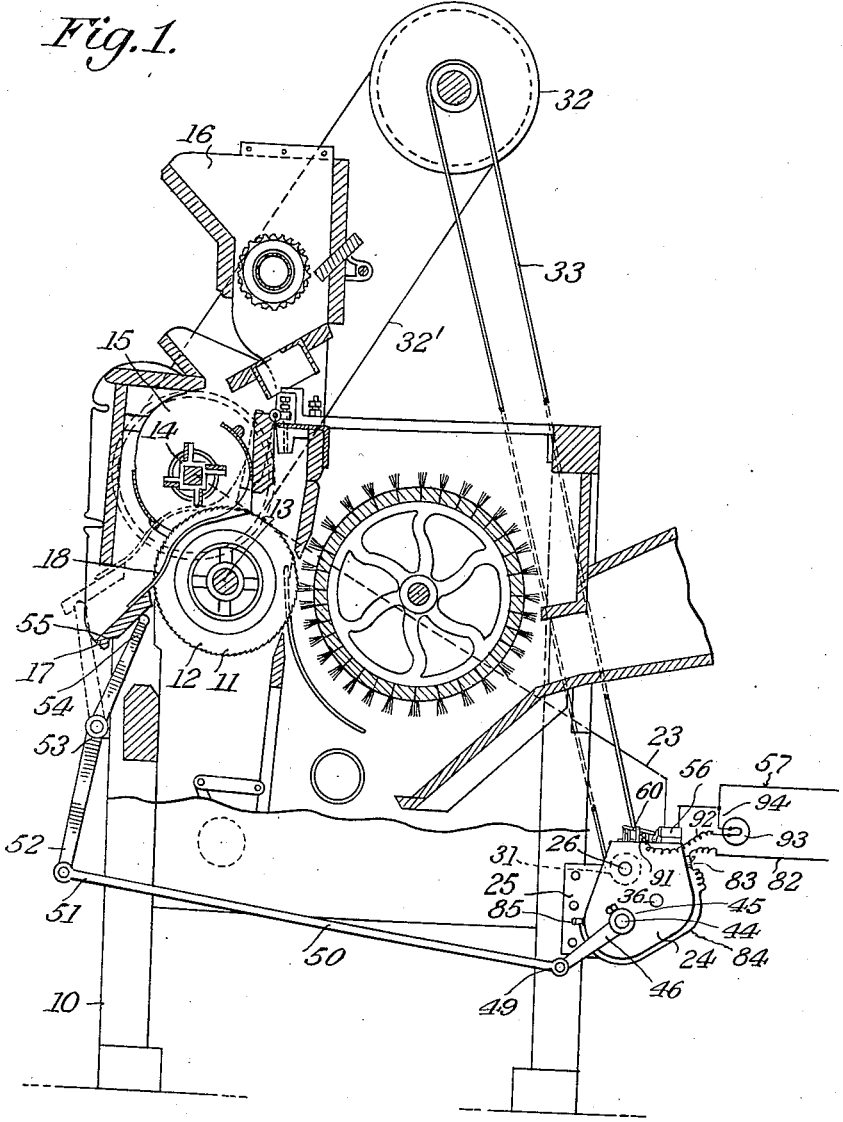
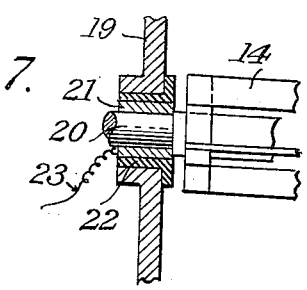
Charles R. Myers
Oscar C. Taylor
                INVENTOR
BY Victor J. Evans & Co.
                ATTORNEYS Dec. 10, 1940.  C. R. MYERS ET AL  2,224,272
AUTOMATIC SAW PROTECTOR
Filed March 18, 1940  2 Sheets-Sheet 2
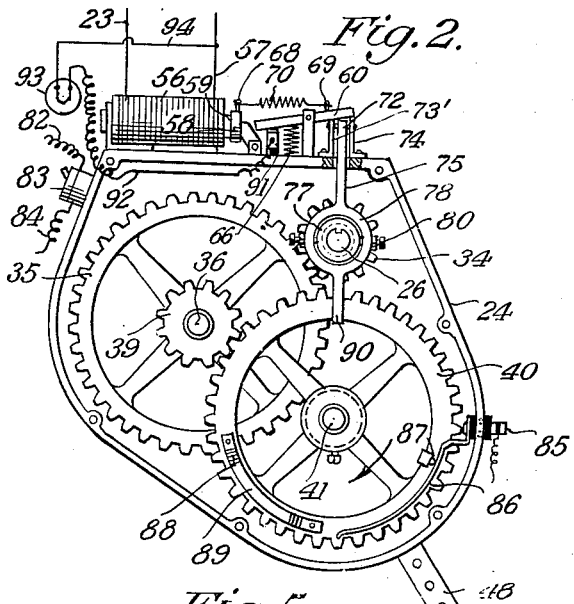
Fig. 2.
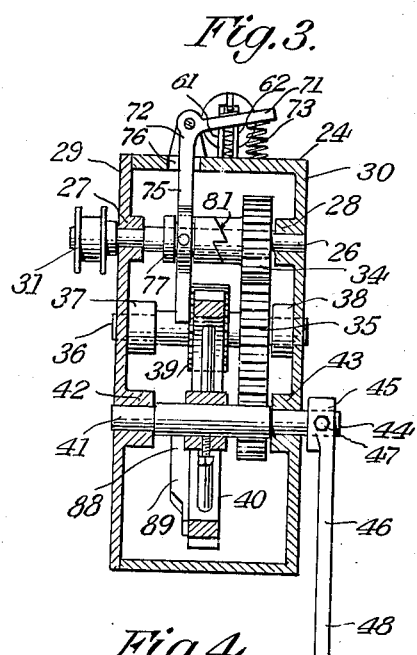
Fig. 3.
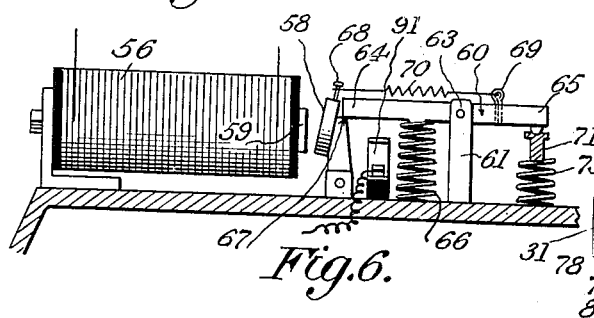
Fig. 5.
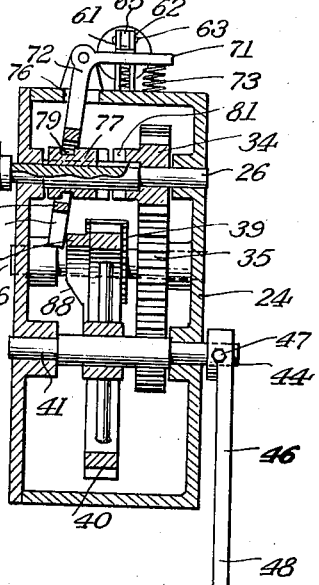
Fig. 4.
Fig. 6.
Charles R. Myers
Oscar C. Taylor
INVENTOR
BY Victor J. Evans & Co.
ATTORNEYS Patented Dec. 10, 1940

2,224,272

UNITED STATES PATENT OFFICE 2,224,272

AUTOMATIC SAW PROTECTOR

Charles R. Myers and Oscar C. Taylor, Tyler, Tex.

Application March 18, 1940, Serial No. 324,688

11 Claims. (Cl. 19—55)

Our invention relates to new and useful improvements in cotton ginning and linting machines.

Our invention particularly contemplates an organization that is adapted to be applied to a conventional cotton ginning and linting apparatus. The usual construction of such devices includes a plurality of spaced circular saw elements rotatable on a common shaft, which saw elements coact with a juxtaposed float or beater to separate the cotton fibers from the seeds. A plurality of pivoted ribs are associated with the saws in such a manner that one of the ribs will be interposed between each of the saw members and arranged to hold the raw cotton passing between the saws and beater adjacent the peripheral teeth of the saws. It frequently happens that a nail or similar metallic object will be inadvertently introduced into the machine and either work irrepairable damage upon engagement thereof with the saw elements, or badly jam or stall the entire machine before the same can be stopped and the obstruction removed.

The occurrence of the above-named contingency is usually extremely serious in its nature for the reason that the customary procedure is to have a large number of the machines operating simultaneously and substantially automatically, which machines are tended by a relatively small number of operators. When an obstructing object passes into one of the machines it is often difficult to determine which of the machines is being damaged and it frequently happens that considerable time elapses before such machine is found and rendered inoperative.

The present invention concerns itself primarily with a means for automatically and immediately elevating the ribs to a position above the saws, thereby removing the obstructing object from its association with the saw elements. The movement of the ribs in the above manner will sound an alarm signal which will immediately appraise the tenders as to which of the devices has been rendered inoperative. The present invention in no way interferes with or impairs the normal operation of the machine and comprises an independent unit which may be easily and expeditiously attached to any standard type of ginning and linting machine of the above-described character. The device cooperates with the parts of the machine in a unique manner to prevent permanent and irrepairable damage to the saw elements, but until the occurrence of the above-mentioned contingency the device permits the machine to operate normally and without interference.

Other objects and advantages of our invention will be apparent during the course of the following description.

In the drawings, forming a part of this specification, and wherein like numerals are employed to designate like parts throughout the same, Figure 1 is a vertical sectional view of a cotton ginning and linting machine, and illustrating a device embodying our invention incorporated therewith, Figure 2 is a side elevation of the operating mechanism embodying a part of our device and showing the cover plate of the casing removed, Figure 3 is a vertical sectional view thereof showing the clutch engaged with the gear means, Figure 4 is a view similar to Figure 3, but showing the clutch disengaged from the gear means, Figure 5 is a fragmentary side elevation of the casing top and showing a clutch operating mechanism embodying a part of our invention, Figure 6 is a top plan view of the same, and Figure 7 is a fragmentary sectional view, illustrating the manner in which the float of the ginning and linting machine is associated with the supporting stand for proper cooperation with the present invention.

In the accompanying drawings, wherein for the purpose of illustration, is shown a preferred embodiment of our invention, the numeral 10 designates the metallic stand of a cotton ginning and linting machine. The stand supports the various adjuncts of the machine in the conventional manner, which parts are here shown merely for the purpose of illustrating the association of the present invention therewith. The conventional cotton ginning and linting machine is provided with a horizontally arranged saw roller 11 rotatably mounted on the frame, which roller comprises a plurality of spaced circular saw elements 12 mounted on the common shaft 13 and driven by the motor 32 through the endless belt 32'. A float or beater 14 is coextensive with the saw roller and is arranged in spaced parallel relation thereabove in a manner to direct the raw cotton introduced into the roll box 15 from the hopper 16 into the interstice between the beater and the peripheral teeth of the saw elements. In order that the cotton passing between the float and saw elements will be maintained in contactual relation with the teeth of the saw elements the greatfall 17 is pivotally mounted to the frame and with the spaced parallel rib elements 18 interposed between each of the saw elements 12. As clearly illustrated in Figure 1, the ribs 18 are bowed upwardly to substantially follow the contour of the saw elements and to constantly urge the raw cotton into engagement with the teeth whereby the cotton fibers may be efficiently and efficaciously separated from the seeds. The above arrangement is old and will be readily understood by anyone skilled in the art.

For the purpose of the present invention the opposite ends of the float 14 are insulated from the metallic current conducting side walls 19 of the roll box within which it is journaled. The float may be insulated from the stand in the manner illustrated in Figure 7 wherein the journals 20 of the float are received by the metallic bearings 21 in the conventional manner and wherein the bearings are electrically separated from the stand by the insulating gromets 22.

Our device contemplates a mechanism electrically grounded to the metallic frame 10 and electrically connected to the insulated float 14 by the conductor 23. The mechanism includes parts cooperatively associated with the greatfall 17 in a manner whereby the passing of a metallic object between the float and saw roller will complete a circuit to render the mechanism operative to move the greatfall to the position shown by the dotted lines in Figure 1. As illustrated, the movement of the greatfall to the dotted line position will raise the ribs 18 above the saw elements 12 thereby disengaging the obstructing object from the saw elements.

The casing 24 contains the operating mechanism and is attached to and electrically grounded with the frame by the flange 25. The drive shaft 26 extends transversely of the casing and has the opposite ends thereof journaled in the bearings 27 and 28 formed on the side walls 29 and 30 thereof. The end of the shaft received by the side wall 29 extends therethrough and has the pulley 31 fixedly secured thereto and connected to the motor 32 by the endless belt 33, whereby the shaft may be continuously driven during the operation of the cotton ginning and linting machine. The pinion 34 is freely rotatable on the drive shaft and meshes with the spur gear 35 fixedly secured to the countershaft 36, the opposite ends of which shaft are journaled in the bearings 37 and 38 formed on the side walls of the casing. The pinion 39 is fixed to the countershaft for rotation therewith and meshes with the driven spur gear 40 fixedly associated with the driven shaft 41, the opposite ends of which shaft are journaled in the bearings 42 and 43 on the side walls of the casing.

The end 44 of the driven shaft extends outwardly of the casing and the end 45 of the arm 46 is fixedly secured thereto by the set screw 47. The free end 48 of the arm is pivotally connected to the end 49 of the link 50, and the opposite end 51 of the link is pivoted to the terminal end 52 of the bell crank lever 53, which lever is rockably journaled to the stand 10 below the greatfall 17 for movement about a horizontal axis. The opposite end 54 of the bell crank lever normally bears against the bottom face of the greatfall and, upon swinging movement of the arm 46 in an anti-clockwise direction, the end 54 of the bell crank lever will ride along the bottom face of the greatfall and seat within the recess 55. Actuation of the bell crank lever in the above manner will move the greatfall to the dotted line position illustrated in Figure 1, whereby the ribs 18 will be elevated to a position substantially above the peripheral teeth of the saw elements 12.

The conductor 23 is connected to one terminal of the electromagnet 56 carried by and insulated from the casing 24. The conductor 57 is connected to the other terminal of the electromagnet and extends therefrom to the negative side of the current source, and energization of the electromagnet will move the pivoted trigger bar 58 against the core 59 of the magnet. The lever 60 is pivoted between the bracket arms 61 and 62 for oscillatory movement about a horizontal axis, the pivot 63 being located intermediate the ends 64 and 65 of the lever. The coil spring 66, mounted on the casing top below the end 64 of the lever arm, bears against the under side of the lever in a manner to normally hold the same in a substantially horizontal position and with the end 64 seated upon the abutment 67 extending rearwardly from the trigger bar 58. The pin 68 extends upwardly from the trigger bar and is connected to the eyebolt 69 at the far side of the pivot 63 by the coil spring 70.

When the lever 60 is horizontally positioned, the end 65 thereof bears against the transversely extending arm 71 of the bell crank lever 72 to hold the same depressed against the resilient action of the coil spring 73. The bell crank lever is mounted between the bracket arms 73' and 74 formed on and extending upwardly from the top of the casing for oscillatory movement about a horizontal axis. The opposite arm 75 of the lever extends within the casing through the elongated slot 76 to engage the slidable clutch 77 slidably keyed to the drive shaft 26. The arm 75 is formed with an annulation 78 which encompasses the clutch circumjacent the peripheral groove 79. The set screws 80 carried by the annulation extend radially inwardly and with the inner ends thereof seated within the annular groove 79 whereby the clutch may have a free rotation relative to the annulation and whereby the said arm may slidably actuate the clutch arm along the shaft and into engagement with the cooperating clutch face 81 of the pinion 34.

When the lever 60 is horizontally positioned, as illustrated in Figure 5, the arm 71 of the bell crank lever 72 will be depressed in a manner whereby the arm 75 thereof will hold the clutch disengaged from the clutch face 81 of the pinion 34. Energization of the electromagnet 56 will move the trigger bar 58 against the core 59 and disengage the end 64 of the lever from the abutment 69. The combined resilient actions of the springs 70 and 73 will rock the lever about its pivot and lower the end 64 thereof against the resilient action of the spring 66. The consequential elevation of the end 65 of the lever will permit the spring 73 to rock the bell crank lever 72 about its pivot whereby the arm 75 will slidably actuate the clutch 77 along the shaft 26 and into engagement with the clutch face 81 of the pinion 34, as illustrated in Figure 3. By virtue of the fact that the shaft 26 is continuously driven by the motor 32, the engagement of the clutch with the clutch face of the gear will impart rotation to the gear, which rotation will be transmitted to the spur gears 35 and 40.

The conductor 82 extending from the positive side of the current source is connected to the main switch 83, and the conductor 84 extends from the switch 83 to the terminal 85 connected to and insulated from the casing adjacent the driven spur gear 40. The elongated segmental contact bar 86 carried by the terminal within the casing laterally of the gear 40 is normally engaged by the contact pin 87 projecting laterally from the gear, whereby current may flow through the terminal 85 and through the grounded casing and stand 10 to the saw elements 12. When the saw elements are short-circuited across the float 14, the current may traverse the conductor 23 to energize the electromagnet 56 and pass from the electromagnet to the current source through the conductor 57.

When the end 64 of the lever 60 is released from the abutment by energization of the electromagnet it will engage the insulated contact 91. The current may then flow from the grounded casing through the contact and along the conductor 92 to the signal means 93, and from the signal means through the conductors 94 and 57 to the source of current supply.

Energization of the electromagnet and the consequential engagement between the clutch 57 and the clutch face of the pinion 34 will move the driven spur gear 40 in the direction of the arrow in Figure 2, whereby the pin 87 will traverse the contact bar 86. Current may flow through the above-described circuit until the gear 40 has rotated a sufficient distance to disengage the pin 87 from the contact bar at which time the circuit will be broken, and the electromagnet will release the trigger bar 58. The gears will continue to be driven by the motor 32 until the cam face 88 of the release bar 89 carried by the gear 40 moves into engagement with the depending shank portion 90 of the bell crank lever arm 75. Engagement of the release bar with the shank will slide the clutch along the shaft 26 and out of engagement with the pinion 34, as illustrated in Figure 4, and hold the same in such position to permit the coil spring 66 to again position the end 64 of the lever 60 in engagement with the abutment 67.

It may thus be seen that closing of the circuit between the saw elements 12 and the float 14 will energize the electromagnet 56 to release the lever 60. Release of the lever 60 will close a circuit through the signal means 93 to appraise the operator of the particular machine affected. Release of the lever will also effect engagement between the clutch and the gears within the casing 24, whereby the arm 46 will be caused to move in the direction of the arrow in Figure 1, which movement will be transmitted to the bell crank lever 53 through the link 50 to move the greatfall 17 to the elevated position. Movement of the ribs 18 of the greatfall to a position above the teeth of the saw elements will move the object producing the short-circuit between the saw elements and the float to a position free from engagement with the saws. The above action will prevent further damage to the saws and will break the circuit between the float and saw roller. When the clutch 77 is disengaged from the gears within the casing 24 by the release bar 89, further movement of the mechanism within the casing will be prevented and the effective operation of the ginning and linting mill will cease until the operator removes the obstructing object and returns the arm 46 to the initial position.

It is to be understood that the form of our invention, herewith shown and described, is to be taken as a preferred example of the same, and that various changes in the size, shape and arrangement of parts may be resorted to without departing from the spirit of our invention, or scope of the appended claims.

Having thus described our invention, we claim:

1. In a linting and ginning device including a current conducting stand having a saw means rotatably associated therewith, a float insulated from the stand and disposed in juxtaposition to the saw means, and pivoted rib elements normally associated with the saw means in a manner to direct materials between the said saw means and float, means to dissociate the said rib elements from the saw comprising an electromagnetic means; a circuit connecting the electromagnetic means to the saw and float and normally broken therebetween but adapted to be closed by the passage of a current conducting object between the float and saw; driven means coactive with the rib elements to move the same free from the saw means; and a drive means normally dissociated from the driven means, said drive means being actuated into engagement with the driven means by the electromagnetic means upon closing of the said circuit.

2. In a linting and ginning device including a current conducting stand having a saw means rotatably associated therewith, a float insulated from the stand and disposed in juxtaposition to the saw means, and pivoted rib elements normally associated with the saw means in a manner to direct materials between the said saw means and float, means to dissociate the said rib elements from the saw comprising an electromagnetic means; a circuit connecting the electromagnetic means to the saw and float and normally broken therebetween but adapted to be closed by the passage of a current conducting object between the float and saw; driven means coactive with the rib elements to move the same free from the saw means; a drive means normally dissociated from the driven means, said drive means being actuated into engagement with the driven means by the electromagnetic means upon closing of the said circuit; and a normally closed switch means connected in the said circuit and associated with the said drive means in a manner to be opened thereby after actuation of the same for a predetermined interval.

3. In a linting and ginning device including a current conducting stand having a saw means rotatably associated therewith, a float insulated from the stand and disposed in juxtaposition to the saw means, and pivoted rib elements normally associated with the saw means in a manner to direct materials between the said saw means and float, means to dissociate the said rib elements from the saw comprising an electromagnetic means; a circuit connecting the electromagnetic means to the saw and float and normally broken therebetween but adapted to be closed by the passage of a current conducting object between the float and saw; driven means coactive with the rib elements to move the same free from the saw means; a drive means normally dissociated from the driven means, said drive means being actuated into engagement with the driven means by the electromagnetic means upon closing of the said circuit; a normally closed switch means connected in the said circuit and associated with the said drive means in a manner to be opened thereby after actuation of the same for a predetermined interval; and means to automatically dissociate the drive means from the driven means after the opening of the said switch.

4. In a linting and ginning device including a current conducting stand having a saw means rotatably associated therewith, a float insulated from the stand and disposed in juxtaposition to the saw means, and pivoted rib elements normally associated with the saw means in a manner to direct materials between the said saw means and float, means to dissociate the said rib elements from the saw comprising an electromagnetic means; a circuit connecting the electromagnetic means to the saw and float and normally broken therebetween but adapted to be closed by the passage of a current conducting object between the float and saw; driven means coactive with the rib elements to move the same free from the saw means; a drive means movable into engagement with the said driven means by the electromagnetic means upon closing of the said circuit; and a circuit connected to the said first circuit and including a signal means and a normally open switch adapted to be closed upon movement of the drive means into engagement with the said driven means.

5. In a linting and ginning device including a current conducting stand having a saw means rotatably associated therewith, a float insulated from the stand and disposed in juxtaposition to the saw means, and pivoted rib elements normally associated with the saw means in a manner to direct materials between the said saw means and float, means to dissociate the said rib elements from the saw comprising an electromagnetic means; a circuit connecting the electromagnetic means to the saw and float and normally broken therebetween but adapted to be closed by the passage of a current conducting object between the float and saw; driven means coactive with the rib elements to move the same free from the saw means; a drive means movable into engagement with the said driven means by the electromagnetic means upon closing of the said circuit; a circuit connected to the said first circuit and including a signal means and a normally open switch adapted to be closed upon movement of the drive means into engagement with the said driven means; a switch carried by the driven means and connected to the first circuit, said switch being automatically opened after engagement of the drive and driven means for a predetermined interval; and means to automatically disengage the drive means from the driven means after opening of the said switch.

6. In a linting and ginning device including a current conducting stand having a saw means rotatably associated therewith, a float insulated from the stand and disposed in juxtaposition to the said saw means, and pivoted rib elements normally associated with the saw means in a manner to direct materials between the said saw means and float, means to dissociate the said rib elements from the saw means comprising an electromagnetic means including a circuit connected to and normally broken by the said saw means and float; and a mechanism actuated by the electromagnetic means and cooperatively associated with the said rib elements to move the same free from the saw means, said mechanism being rendered operative by closing of the said circuit and said circuit being closed by any foreign electrically conductible matter simultaneously contacting the saw means and float.

7. In a linting and ginning device including a current conducting stand having a saw means rotatably associated therewith, a float insulated from the stand and disposed in juxtaposition to the saw means, and pivoted rib elements normally associated with the saw means in a manner to direct materials between the said saw means and float, means to dissociate the said rib elements from the saw comprising an electromagnetic means; a circuit connecting the electromagnetic means to the saw and float and normally broken therebetween but adapted to be closed by the passage of a current conducting object between the float and saw; gear means; a continuously driven clutch movable into engagement with the gear means to actuate the same upon energization of the electromagnetic means; and a driven means connected to the gear means and coactive with the rib elements to move the same free from the saw means upon actuation of the said gear means.

8. In a linting and ginning device including a current conducting stand having a saw means rotatably associated therewith, a float insulated from the stand and disposed in juxtaposition to the said saw means, and pivoted rib elements normally associated with the saw means in a manner to direct materials between the said saw means and float, means to dissociate the said rib elements from the saw means comprising an electromagnetic means including a circuit connected to and normally broken by the said saw means and float; a circuit connected to the said first circuit and including a normally open switch and a signal means; gear means; a continuously driven clutch movable into engagement with the said gear means to actuate the same; a pivoted lever arranged above the switch and cooperative with the said clutch to normally hold the same disengaged from the gear means; and a driven means connected to the gear means and cooperative with the said rib elements to move the same free from the saw means upon actuation of the gear means, the said first circuit being closed by any foreign electrically conductible matter simultaneously contacting the saw means and float, and energization of the electromagnetic means effecting actuation of the pivoted lever to close the switch of the second circuit and to move the said clutch into engagement with the said gear means.

9. In a linting and ginning device including a current conducting stand having a saw means rotatably associated therewith, a float insulated from the stand and disposed in juxtaposition to the saw means, and pivoted rib elements normally associated with the saw means in a manner to direct materials between the said saw means and float, means to dissociate the said rib elements from the saw comprising an electromagnetic means; a circuit connecting the electromagnetic means to the saw and float and normally broken therebetween but adapted to be closed by the passage of a current conducting object between the float and saw; gear means; a continuously driven clutch movable into engagement with the gear means to actuate the same upon energization of the electromagnetic means; a driven means connected to the gear means and coactive with the rib elements to move the same free from the saw means upon actuation of the said gear means; a circuit connected to the said first circuit and including a switch comprising a contact carried by the gear means and arranged to ride against a segmental contact bar during a part of the rotation of the gear means; and a cam carried by the gear means, said cam being engageable with parts of the clutch to disengage the same from the gear means after the contact has been moved a sufficient distance to disengage from the said segmental contact bar.

10. A device comprising gear means; an actuator mechanism driven by the said gear means; a continuous driven clutch normally disengaged from but movable into engagement with the gear means to actuate the same; an electromagnetic means cooperative with the said clutch to effect engagement thereof with the gear means; a circuit connected to the electromagnetic means and including a switch comprising a contact carried by the gear means and arranged to ride against a segmental contact bar during a part of the rotation of the gear means; and a cam carried by the gear means, said cam being engageable with parts of the clutch to disengage the same from the gear means after the contact has been moved a sufficient distance to disengage from the said segmental contact bar.

11. A device comprising gear means; an actuator mechanism driven by the said gear means; a continuously driven clutch movable into engagement with the gear means to actuate the same; an electromagnetic means including a circuit having a normally open switch; mutually cooperative pivoted levers actuated by the electromagnetic means, one of said levers being arranged above the said second switch and the other of the levers being cooperative with the said clutch to hold the same disengaged from the gear means until actuation thereof by the electromagnetic means; a circuit connected to the said first circuit and including a switch comprising a contact carried by the gear means and arranged to ride against a segmental contact bar during a part of the rotation of the gear means; and a cam carried by the gear means, said cam being engageable with parts of the clutch to disengage the same from the gear means after the contact has been moved a sufficient distance to disengage from the said segmental contact bar.

CHARLES R. MYERS.
OSCAR C. TAYLOR.